United States Patent
De Pra

(10) Patent No.: US 8,763,518 B2
(45) Date of Patent: Jul. 1, 2014

(54) PERCOLATION MACHINE FOR PRODUCING BEVERAGES

(75) Inventor: Dario De Pra, Mirano (IT)

(73) Assignee: Koninklijke Philips N.V., Eindhoven (NL)

(*) Notice: Subject to any disclaimer, the term of this patent is extended or adjusted under 35 U.S.C. 154(b) by 45 days.

(21) Appl. No.: 13/259,223

(22) PCT Filed: Apr. 6, 2010

(86) PCT No.: PCT/IB2010/051471
§ 371 (c)(1),
(2), (4) Date: Sep. 23, 2011

(87) PCT Pub. No.: WO2010/116318
PCT Pub. Date: Oct. 14, 2010

(65) Prior Publication Data
US 2012/0012009 A1    Jan. 19, 2012

(30) Foreign Application Priority Data
Apr. 9, 2009 (IT) ............................ FI2009A0075

(51) Int. Cl.
*A47J 31/02* (2006.01)
(52) U.S. Cl.
USPC .......................................................... 99/306
(58) Field of Classification Search
USPC ........... 99/275, 279, 280, 281, 283, 285, 286, 99/288, 289 R, 290, 293, 295, 299, 300, 99/302 R, 303, 304, 305, 306, 307, 316, 99/317, 323, 323.3; 426/77, 78, 79, 82, 426/431, 433, 435
See application file for complete search history.

(56) References Cited

U.S. PATENT DOCUMENTS

2008/0282896 A1* 11/2008 Andrew et al. ................. 99/280

FOREIGN PATENT DOCUMENTS

| GB | 2137075 A | 10/1984 |
|----|-----------|---------|
| JP | 63238816 A | 10/1988 |
| JP | 2007502195 A | 2/2007 |
| WO | WO 2007/082869 * | 7/2007 |
| WO | 2008049547 A2 | 5/2008 |

* cited by examiner

*Primary Examiner* — Dana Ross
*Assistant Examiner* — Joseph Iskra

(57) ABSTRACT

The machine comprises: a bearing structure; a housing (9) for a carafe (11); a water reservoir (33); a heating member (21); a filter containment compartment (37) with a lower opening for discharging the beverage towards an underlying carafe; a conduit (23, 25) for supplying water from the water reservoir to the heating member (21) and from this one to the filter containment compartment. The water reservoir and the filter containment compartment are integrated in a member (17) removable from the bearing structure. The removable member can be inserted in a seat (15) implemented in said bearing structure, above said housing for the carafe.

10 Claims, 4 Drawing Sheets

PERCOLATION MACHINE FOR PRODUCING BEVERAGES

FIELD OF THE INVENTION

The present invention relates to the machines for producing beverages, in particular, but not exclusively, for producing coffee. More in particular, the invention relates to improvements to the machines for producing beverages by percolation, that is by means of delivering hot water onto a filter which gathers and keeps a food product, for example coffee powder, therefrom aroma for producing the beverage are extracted by means of the hot water passage.

STATE OF ART

For the production of the so-called filter coffee, that is without cream, percolation machines are used, wherein the coffee powder is arranged above a filter and wherein hot water is sprayed or made to percolate above and through the coffee powder bed kept above the filter. The water crosses the coffee powder bed by gravity and extracts from the powder the aroma for obtaining a coffee-based beverage which is gathered in an underlying carafe or other container.

GB 2137075 describes a machine for producing beverages by percolation having an integral water reservoir and filter holder.

SUMMARY OF THE INVENTION

The object of the invention is a machine of the type described above, with an innovative configuration of the compartment for containing the filter and the water reservoir.

Substantially, in an embodiment, the machine comprises: a bearing structure; a housing for a carafe; a water reservoir; a heating member; a filter containment compartment with a lower opening for discharging the beverage towards an underlying carafe; a duct for supplying water from the water reservoir to the heating member and from this one to the filter containment compartment. The water reservoir and the filter containment compartment are integrated in a member which can be removed from the bearing structure as a single body. The removable member can be inserted in a seat implemented in the bearing structure, above the housing for the carafe. This allows an easy handling of the complex formed by the reservoir and by the filter containment compartment, which simplifies the procedures for filling-up the reservoir, loading the coffee in the filter housed in the filter containment compartment, removing the exhausted powder and the dirt filter, washing, etc.

In a possible embodiment the seat and the housing can be both accessed frontally.

In some embodiments, the removable member can even integrate the hot water dispenser, that is the organ therefrom the hot water is made to percolate onto the coffee powder or other food product gathered onto the filter. In other embodiments, the dispenser can oscillate in order to assume a use position and an uplifted position or a laterally isolated position in order not to obstruct the extraction of the removable member wherein the filter containment compartment and the reservoir are integrated.

However, preferably, the motion of extracting and inserting the removable member is a substantially horizontal motion, so that the seat for receiving the removable member can have, in the upper cover part, the hot water dispenser which in this way is not required to be shifted or removed together with the water reservoir and to the filter containment compartment.

Preferably, the seat is open frontally, that is on the same side therefrom the carafe housing, wherein the coffee is gathered, can be accessed. However, this is not strictly necessary, as the seat for receiving the water reservoir and the la filter containment compartment could be opened laterally instead of frontally.

In some embodiments the removable member comprises an outer wall surrounding a water containment volume, which volume surrounds at least partially the filter containment compartment. Preferably, the water containment volume surrounds a good portion or completely the filter containment compartment, that is it encloses it by an angle of at least 270°, preferably at least 300° and still more preferably 360°. This allows maximizing the water volume by keeping limited the sizes of the removable member.

Additional advantageous features and embodiments of the machine according to the invention are shown in the enclosed claims and they will be described in greater detail hereinafter.

In the present invention the use of the machine for producing coffee is referred to in a specific way. However, the same features can be implemented in a machine for preparing other types of beverages by percolation, for example tea or the like.

BRIEF DESCRIPTION OF THE DRAWINGS

The invention will be better understood by following the description and the enclosed drawing, wherein.

DETAILED DESCRIPTION OF THE INVENTION EMBODIMENTS

Figure 1:
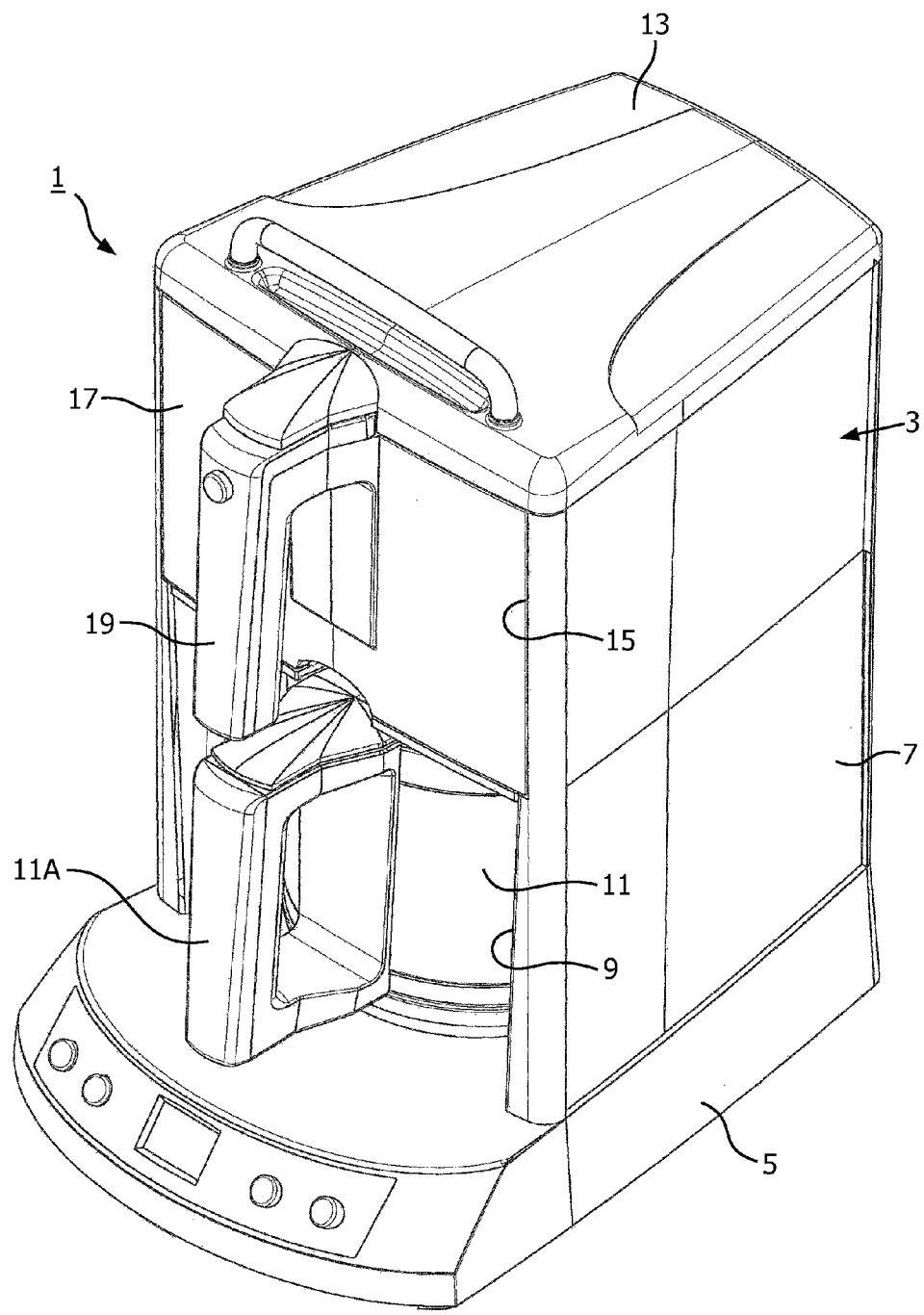
FIG. 1 shows a perspective view of a machine incorporating the invention.
Figure 2:
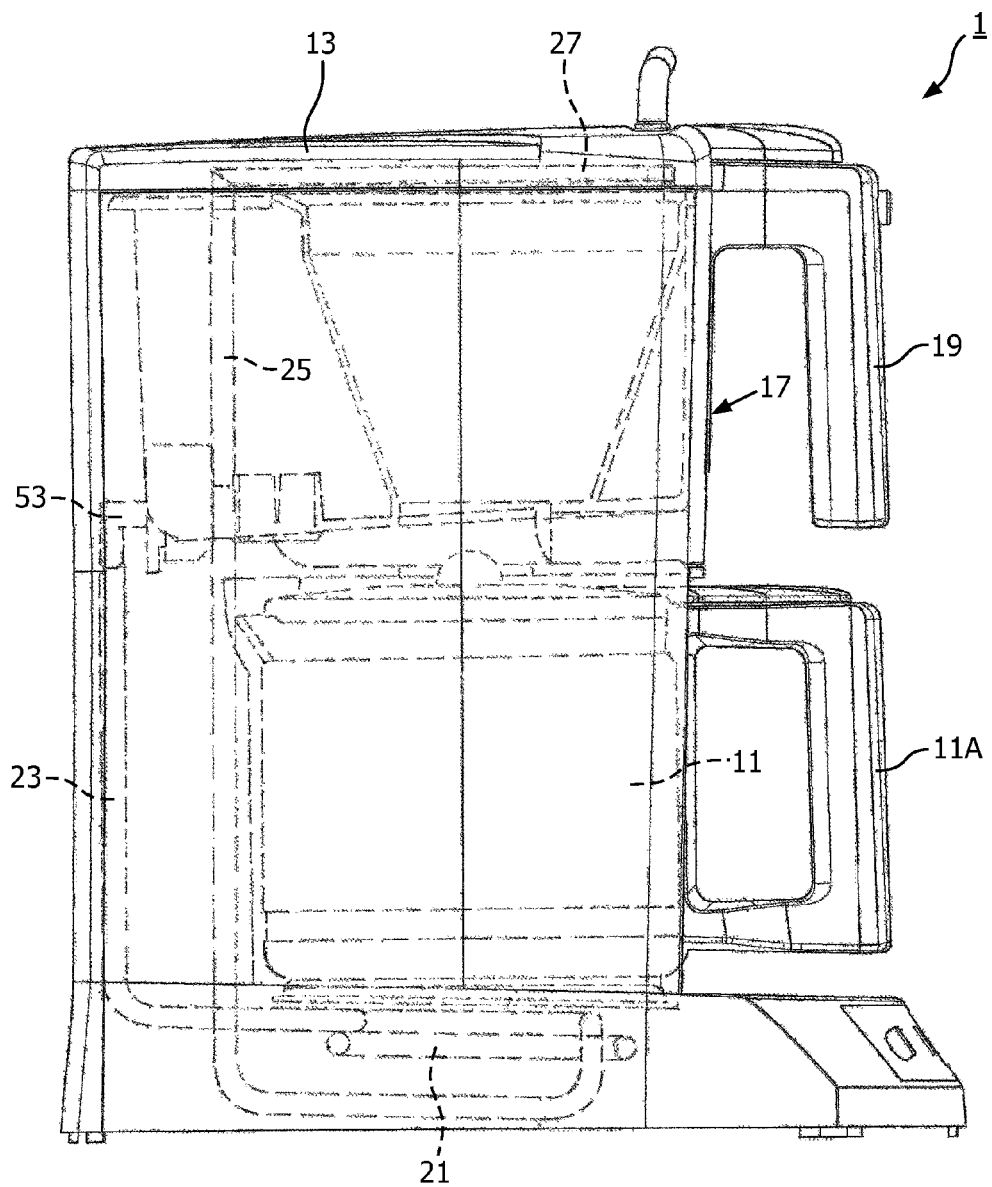
FIG. 2 shows a side view of the machine of FIG. 1.

An embodiment of a machine according to the invention is illustrated as a whole in FIGS. 1 and 2. The machine is designated as a whole with 1. It has a bearing structure 3 with a base 5 and sides 7. A housing 9 for a carafe 11 or other container for gathering the beverage obtained by percolating hot water through a coffee power bed or the like is defined between the base 5 and the sides 7.

The bearing structure 3 is closed on the upper portion by a covering wall 13. Between this wall, the sides 7 and the housing 9 for the carafe 11 a seat 15 is defined, wherein a member 17 can be inserted and wherefrom it can be removed, wherein the water reservoir and the filter containment compartment are implemented in an integrated way, as it will be described hereinafter in greater detail by referring to FIGS. 4 to 7.

In some embodiments, the removable member 17 has a handle 19, to facilitate the procedure for extracting and inserting into the structure 3 of the machine 1. The handle 19 is preferably positioned so that when the machine is under operating conditions said handle 19 is overlaid and approximately aligned to a handle 11A of the carafe 11 inserted in the underlying housing 9.

As schematically and briefly shown in FIG. 2, in a way known on itself the machine 1 comprises a heating member 21, preferably inserted into the base 5 of the machine, which can be used to heat water for preparing the beverage and in case even to keep in temperature the carafe 11 with the content thereof.

A conduit for supplying water from the reservoir integrated in the removable member 17 to the heating member 21 is schematically designated with 23. A hot water ascending conduit, connected with a dispenser schematically designated with 27, housed in the cover 13 of the machine in position corresponding to the one assumed by the filter containment compartment integrated in the removable member 17, is schematically designated with 25. In this way the hot water ascending towards the conduit 25 is made to percolate onto the coffee powder or other product arranged in the filter inserted in the filter containment compartment integrated in the removable member 17.

The operation of the conduits 23, 25 and of the heating member 21 is known on itself and it will be not described in greater detail in this seat. Embodiment examples of these components of the machine are described in the patent literature mentioned in the preamble, the content thereof is incorporated in the present description.

Figure 3:
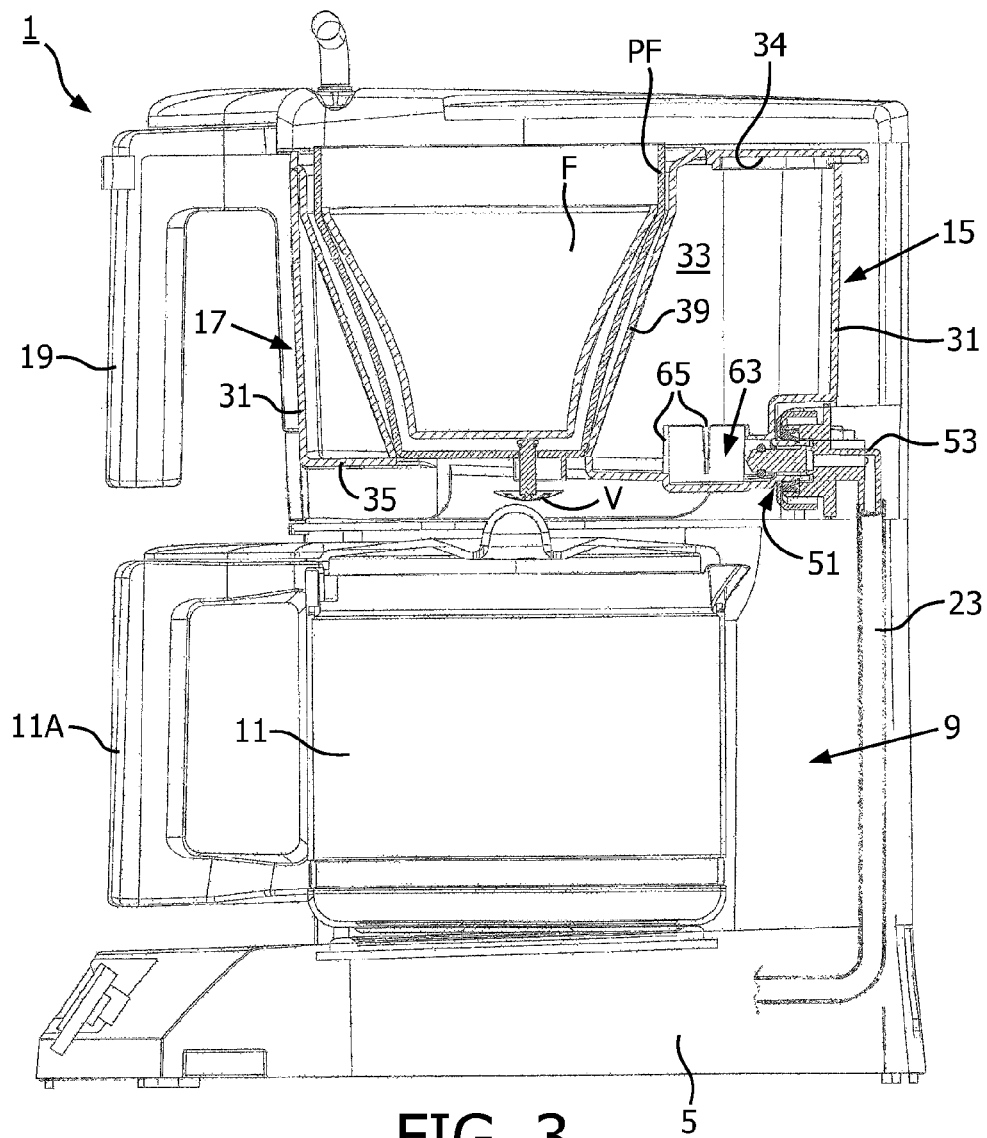
FIG. 3 shows a section according to a vertical plane of the machine of FIGS. 1 and 2.
Figure 4:
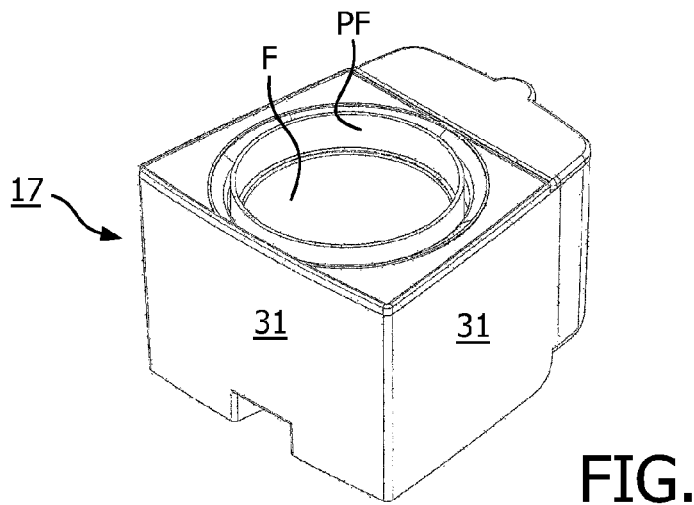
FIG. 4 shows a perspective view of the removable member wherein the filter containment compartment and the water reservoir are implemented.

The removable member 17 is illustrated in greater detail in the section of FIG. 3 and in the views and sections of FIGS. 4 to 7. In the latter the removable member 17 is shown without the handle 19, for greater representation clarity.

The removable member 17 comprises side walls 31 delimiting laterally a volume 33 of a water reservoir for the water, closed on the lower portion by a bottom wall 35. From the bottom 35 of the removable member 17 a filter containment compartment 37 develops substantially formed by an approximately troncoconical wall 39, preferably with substantially circular section, with an upper opening 41. On the lower portion the wall 39 has an opening 43 (elongated in the illustrated example, see FIG. 5) for discharging the beverage obtained by percolating the water through the powder coffee mass or bed contained in a filter F contained in a filter holder PF. The filter F can be made of paper or with a net structure, for example a metallic or plastic net, or in any other suitable way. The paper filter is disposable, whereas the net filter can be re-used, prior washing. Preferably the filter holder has a closed wall, equipped with a lower opening for discharging the beverage, with a valve V which is opened when the filter holder PF, inserted into the compartment 37, is correctly positioned above the carafe 11 inserted in the machine, as shown in FIG. 3. When the removable member 17 is moved away from the machine the valve V closes by avoiding the beverage dripping.

As it can be observed in FIGS. 3 to 7 the whole volume delimited by the side walls 31, the bottom wall 35 and the conical wall 39 can be used again in order to contain water destined to the coffee production. The so-formed whole water reservoir can be extracted integrally with the filter containment compartment 37, as well as the filter holder PF and the filter F in case inserted in the filter containment compartment itself. This simplifies the procedures for inserting and/or replacing the filter, loading the coffee powder, filling-up the water reservoir, as the removable member 17 can be moved away from the machine 1 and brought for example below a tap to be rinsed and filled-up with water, rested on a table to insert a new filter F and to load the coffee powder inside thereof, and for any other maintenance, cleaning procedure or the like.

In some embodiments, the volume 33 on the upper portion can be closed by a cover 34, preferably constrained to the removable member 17, for example hinged thereto. In this way upon lifting the cover 34 it is possible to fill up, for example under a tap, the volume 33 of the water reservoir and to close the reservoir itself by bringing the cover 34 in the attitude of FIG. 3 to avoid the penetration of dirty, coffee powder or other.

Figure 6:
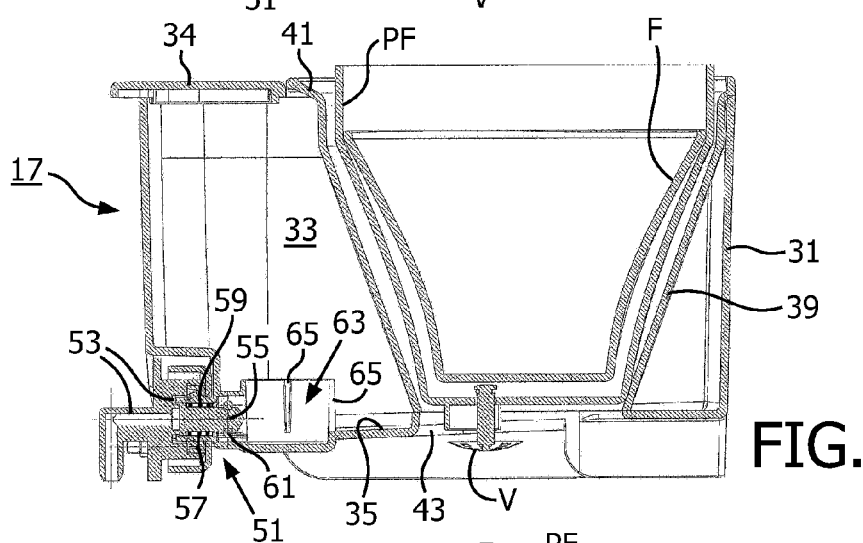
Figure 5:
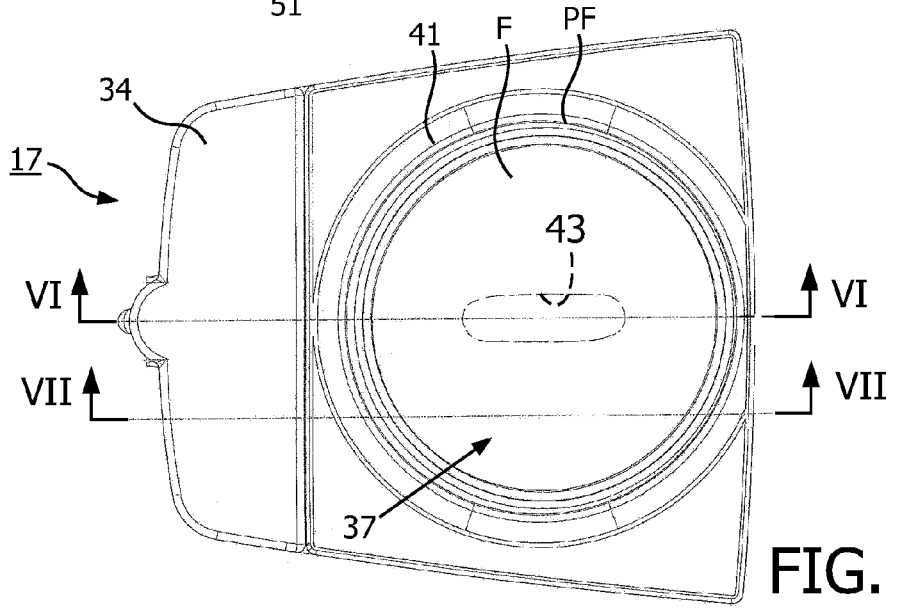
FIG. 5 shows a top view of the member of FIG. 4.

In some embodiments, as it can be seen in particular in the sections of FIGS. 3 and 6, proximate the bottom defined by the wall 35 of the water reservoir implemented in the removable member 17, a connection 51 is arranged, which can be engaged frontally onto the end or connection portion 53 of the water descending conduit, schematically designated with 23 in FIG. 2. A valve 55 is inserted inside the connection 51, housed inside a conduit 57 implemented in the conduit 51. The valve 55 opens by the effect of the frontal push exerted by the end portion 53 of the conduit 23 when the removable member 17 is inserted in the machine 1 until reaching the position of FIG. 3. When the removable member 17 is moved away from the machine, the valve 55 closes under the effect of a compression spring 59. The duct 57 is closed by means of an o-ring 61 brought by the mobile body of the valve 55. In this way the outlet of the water reservoir is closed by preventing the water loss when the removable member 17 is extracted from the machine.

Figure 7:
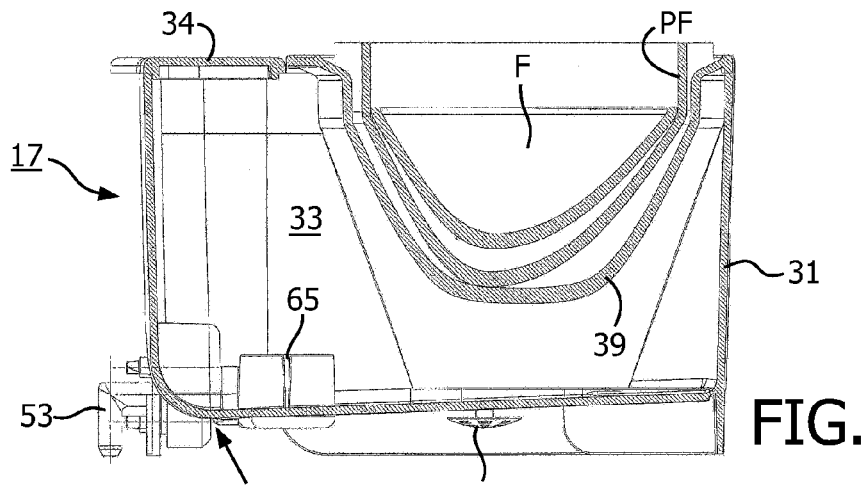
FIGS. 6 and 7 shows sections according to VI-VI and VII-VII of FIG. 5.

In the FIGS. 6 and 7 the connection 51 is illustrated connected to the removable member 17, but it has to be understood that when the latter is extracted from the machine 1 the connection 51 remains in the machine.

The conduit 57 is in flow connection with a housing 63 for an activated carbon filter or other material suitable to filter the water before it flows in the conduit 23. The seat 63 is open on the upper part to allow the water downflow and it has in its own side walls notches 65 which allow to discharge water until the level of the bottom wall 35.

It is meant that the drawing shows just an exemplification given only as practical demonstration of the invention, which can vary in the forms and arrangements without leaving the concept scope at the base of the invention. The possible presence of reference numbers in the enclosed claims aims only at facilitating the reading of the claims by referring to the description and to the drawing, and it does not limit the scope of the protection represented by the claims.

The invention claimed is:

1. A machine for producing beverages by percolation, comprising:
   a bearing structure;
   a housing for a carafe;
   a removable integrated member including only a water reservoir and a filter containment compartment with a lower opening for discharging the beverage toward an underlying carafe, the integrated member being separable from the bearing structure;
   a heating member;
   a conduit for supplying water from the water reservoir to the heating member and from the heating member to the filter containment compartment,
   wherein said removable integrated member is insertable in a seat implemented in said bearing structure, above said housing for the carafe.

2. The machine according to claim 1, wherein said seat is open frontally.

3. The machine according to claim 2, wherein said housing for the carafe can be accessed, from the same side as the removable member.

4. The machine according to claim 1, wherein the bearing structure is closed on an upper portion by a covering wall.

5. The machine according to claim 1, wherein said removable member comprises an outer wall surrounding a water containment volume, said volume surrounding at least partially the filter containment compartment.

6. The machine according to claim 5, wherein said volume surrounds the filter containment compartment by an angle of at least 270°, preferably at least 300° and more preferably 360°.

7. The machine according to claim 1, wherein said water reservoir is at least partially closed by a cover constrained to said removable member.

8. The machine according to claim 7, wherein said cover is hinged to the removable member.

9. The machine according to claim 1, wherein in said water reservoir a housing for a water filter is implemented, in fluid connection with a connection for outletting the water towards said heating member.

10. The machine according to claim 1, wherein said water reservoir comprises a shut-off valve associated to a conduit for supplying water to said heating member, the valve opening when the removable member is housed in the seat thereof in said bearing structure.

* * * * *